US012315323B2

(12) United States Patent
Graham et al.

(10) Patent No.: US 12,315,323 B2
(45) Date of Patent: May 27, 2025

(54) DOCUMENT-COLLECTING APPARATUS OF AUTOMATED TRANSACTION MACHINE AND METHOD

(71) Applicant: Diebold Nixdorf, Incorporated, North Canton, OH (US)

(72) Inventors: Aaron Christopher Graham, Mogadore, OH (US); William Daniel Beskitt, Canton, OH (US)

(73) Assignee: Diebold Nixdorf Incorporated, North Canton, OH (US)

(*) Notice: Subject to any disclaimer, the term of this patent is extended or adjusted under 35 U.S.C. 154(b) by 706 days.

(21) Appl. No.: 17/435,716

(22) PCT Filed: May 1, 2020

(86) PCT No.: PCT/US2020/030995
§ 371 (c)(1),
(2) Date: Sep. 2, 2021

(87) PCT Pub. No.: WO2020/227081
PCT Pub. Date: Nov. 12, 2020

(65) Prior Publication Data

US 2022/0157108 A1 May 19, 2022

Related U.S. Application Data

(60) Provisional application No. 62/845,511, filed on May 9, 2019.

(51) Int. Cl.

| | |
|---|---|
| ***G07D 11/16*** | (2019.01) |
| ***B65H 5/28*** | (2006.01) |

(Continued)

(52) U.S. Cl.
CPC ............... *G07D 11/16* (2019.01); *B65H 5/28* (2013.01); *B65H 29/006* (2013.01); *B65H 75/30* (2013.01);

(Continued)

(58) Field of Classification Search
CPC .. B65H 2301/41912; B65H 2701/1912; B65H 2515/32; B65H 5/28;

(Continued)

(56) References Cited

U.S. PATENT DOCUMENTS 6,585,098 B2 7/2003 Satou
8,125,579 B2 7/2012 Mizoro (Continued)

FOREIGN PATENT DOCUMENTS

JP 2016-18417 A 2/2016
JP 2016-62228 A 4/2016

OTHER PUBLICATIONS

Merged file of KR20130097876 (Year: 2013).*

(Continued)

*Primary Examiner* — Jeffrey A Shapiro
(74) *Attorney, Agent, or Firm* — Black McCuskey

(57) ABSTRACT

A document-collecting apparatus of an automated transaction can include a document-retaining spool, a document-retaining-spool shaft, a web-supply spool, a web-supply-spool shaft, a web, and a single motor. The document-retaining-spool shaft can extend through an orifice in a center of the document-retaining spool. The web-supply-spool shaft can extend through an orifice in a center of the web-supply spool. The web can have a first end wound around the document-retaining spool and a second end opposite to the first end and wound around the web-supply (Continued)

spool. The single motor can be operatively connected to and can selectively drive the document-retaining-spool shaft and the web-supply-spool shaft.

18 Claims, 5 Drawing Sheets

(51) Int. Cl.
*B65H 29/00* (2006.01)
*B65H 75/30* (2006.01)

(52) U.S. Cl.
CPC .. *B65H 2301/4191* (2013.01); *B65H 2403/72* (2013.01); *B65H 2701/1912* (2013.01); *G07D 2211/00* (2013.01)

(58) Field of Classification Search
CPC ................ B65H 2403/70; B65H 75/30; B65H 2403/722; B65H 31/28; B65H 29/006; B65H 29/58; G07D 11/18; G07D 11/16; G07D 9/00; G07D 11/225; G07D 2211/00; G07D 11/10
See application file for complete search history.

(56) References Cited

U.S. PATENT DOCUMENTS

| | | | | |
|---|---|---|---|---|
| 9,150,375 | B2 | 10/2015 | Arikata | |
| 11,580,809 | B2 * | 2/2023 | Togano | G07D 11/18 |
| 2010/0100245 | A1 * | 4/2010 | Oishi | B65H 29/006 700/275 |
| 2012/0104015 | A1 * | 5/2012 | Ebinuma | B65H 29/006 221/13 |
| 2020/0156892 | A1 * | 5/2020 | Fujiwara | B65H 54/2812 |

OTHER PUBLICATIONS

Merged file of JP2016062228A (Year: 2016).*
International Search Report filed in the corresponding PCT application dated Sep. 28, 2020; 2 pages.
Written Opinion of the International Searching Authority filed in the corresponding PCT application dated Jun. 29, 2020; 5 pages.
Machine Translation of JP2016-18417 provided with the International Search Report dated Jun. 29, 2020; 5 pages.
Machine Translation of JP2016-62228; 45 pages.
International Preliminary Report on Patentability filed in the corresponding PCT Application; 6 pages.

* cited by examiner

DOCUMENT-COLLECTING APPARATUS OF AUTOMATED TRANSACTION MACHINE AND METHOD

CROSS-REFERENCE TO RELATED APPLICATIONS

This application is a national phase filing claiming the benefit of International Application No. PCT/US2020/30995, filed May 1, 2020, for a DOCUMENT-COLLECTING APPARATUS OF AUTOMATED TRANSACTION MACHINE AND METHOD. This application also claims the benefit of U.S. Provisional Patent Application Ser. No. 62/845,511 for a DOCUMENT-COLLECTING APPARATUS OF AUTOMATED TRANSACTION MACHINE AND METHOD, filed on May 9, 2019, which is hereby incorporated by reference in its entirety.

BACKGROUND

1. Field

The present disclosure relates to the field of automatic transaction machines and document-collecting apparatuses of automatic transaction machines, and methods of operating such.

2. Description of Related Prior Art

An automated transaction machine can include a slot in the automated transaction machine's fascia through which a user can attempt to deposit documents, such as paper checks or currency, into the automated transaction machine. The automated transaction machine can include a document-collecting apparatus which can store deposited documents within the interior of the automated transaction machine. Documents can also be transferred from the document-collecting apparatus back to the user, including through the same slot in the fascia through which documents are deposited.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A document-collecting apparatus of an automated transaction can include a document-retaining spool, a document-retaining-spool shaft, a web-supply spool, a web-supply-spool shaft, a web, and a single motor. The document-retaining-spool shaft can extend through an orifice in a center of the document-retaining spool. The web-supply-spool shaft can extend through an orifice in a center of the web-supply spool. The web can have a first end wound around the document-retaining spool and a second end opposite to the first end and wound around the web-supply spool. The single motor can be operatively connected to and can selectively drive the document-retaining-spool shaft and the web-supply-spool shaft.

In other features, the document-collecting apparatus can also include a single belt interconnecting a drive shaft of the single motor with both of the document-retaining-spool shaft and the web-supply spool shaft. The document-retaining spool and the document-retaining-spool shaft can be fixed together for concurrent rotation and the web-supply spool and the web-supply-spool shaft are rotatable with respect to one another. The document-collecting apparatus can also include a first clutch operably disposed between the belt and the web-supply-spool shaft. The single motor can be configured to rotate the drive shaft in first and second, opposite directions. The first clutch can be configured to transmit movement of the belt to rotation of the web-supply-spool shaft only when the drive shaft is rotating in the first direction. The document-collecting apparatus can also include a mounting plate and a second clutch. The mounting plate can support a second end of the web-supply-spool shaft. The second clutch can be operably disposed between the mounting plate and the web-supply-spool shaft. The second clutch can be configured to prevent movement of the web-supply-spool shaft only when the drive shaft is rotating in the second direction. The document-collecting apparatus can also include a third clutch operably disposed between the web-supply-spool shaft and the web-supply spool. The third clutch can be configured to dampen relative movement between the web-supply-spool shaft relative to the web-supply spool when the drive shaft is rotating in either of the first or second directions. The third clutch can also include a first portion fixed on the web-supply-spool shaft and a second portion engaged with the web-supply spool and a friction surface positioned between the first and the second portion. The second portion can be freely rotatable relative to the web-supply-spool shaft. The first portion and the second portion can be configured to slide across one another along the friction surface during movement relative to one another. The document-collecting apparatus can also include a torsion spring operably disposed between the second portion of the third clutch and the web-supply spool.

A method of collecting documents in an automated transaction machine can include extending a document-retaining-spool shaft through an orifice in a center of a document-retaining spool. The method can also include extending a web-supply-spool shaft through an orifice in a center of a web-supply spool. The method can also include winding a first end of a web around the document-retaining spool and winding a second end of the web opposite to the first end around the web-supply spool. The method can also include selectively driving both of the document-retaining-spool shaft and the web-supply-spool shaft with a single motor.

According to other features, the selectively driving can further comprise operatively connecting a drive shaft of the single motor to the document-retaining-spool shaft and also to the web-supply-spool shaft with a single belt. The method can also include passing the web around a first pinch roller positioned between the document-retaining spool and the web-supply spool. The method can also include receiving a document through the slot. The method can also include rotating the drive shaft of the single motor in a first rotational direction and thereby drawing the web onto the document-retaining spool and also passing the web around the first pinch roller in a second rotational direction. The method can also include directing the document between the first pinch roller and a second pinch roller after the receiving whereby the web and the document are pressed together between the first and second pinch rollers during the rotating. The method can also include drawing, during the rotating, the document in between first and second portions of the web wound about the document-retaining-spool with both of the first and second portions of the web in contact with the document. The method can also include rotating the drive shaft of the single motor in a third rotational direction opposite of the first rotational direction, thereby drawing the web onto the web-supply spool and also passing the web around the first pinch roller in a fourth rotational direction opposite of the second rotational direction. The method can also include separating the document from the first portion of the web with a scraper during the rotating. The method can also include directing the document between the scraper and the second pinch roller to the first pinch roller and the second pinch roller during the rotating of the drive shaft of the single motor in the third rotational direction. The method can also include directing the document between the first pinch roller and the second pinch roller after the separating whereby the web and the document are separated from one another during the rotating of the drive shaft of the single motor in the third rotational direction.

An automated transaction machine (ATM) can include a fascia and a document-collecting apparatus. The fascia can include a slot. The document-collecting apparatus can be positioned within the ATM to receive documents inserted through the slot. The document-collecting apparatus can include a document-retaining spool, a document-retaining-spool shaft, a web-supply spool, a web-supply-spool shaft, a web, and a single motor. The document-retaining-spool shaft can extend through an orifice in a center of the document-retaining spool. The web-supply-spool shaft can extend through an orifice in a center of the web-supply spool. The web can have a first end wound around the document-retaining spool and a second end opposite to the first end and wound around the web-supply spool. The single motor can be operatively connected to and can selectively drive the document-retaining-spool shaft and the web-supply-spool shaft.

According to additional features, the ATM can also include a belt interconnecting a drive shaft of the motor with both of a first end of the document-retaining-spool shaft and a first end of the web-supply-spool shaft. The ATM can also include a mounting plate supporting both of a second end of the document-retaining-spool shaft and a second end of the web-supply-spool shaft. The ATM can also include a first clutch operably positioned between the first end of the web-supply-spool shaft and the belt. The first clutch can be configured to transmit only one direction of movement of the belt into rotation of the web-supply-spool shaft. The ATM can also include a second clutch operably positioned between the second end of the web-supply-spool shaft and the mounting plate. The second clutch can be configured to permit rotation of the web-supply-spool shaft in only one direction. The orifice of the web-supply spool can be circular. The ATM can also include a friction clutch operably positioned between the web-supply spool and the web-supply-spool shaft. The friction clutch can permit and dampen relative movement between the web-supply spool and the web-supply-spool shaft. The ATM can also include a torsion spring operably positioned between the web-supply spool and the friction clutch. The torsion spring can permit relative movement between the web-supply spool and the friction clutch, can store energy associated with relative movement between the web-supply spool and the friction clutch through elastic deformation, and can induce relative movement between the web-supply spool and the friction clutch through elastic recovery. The ATM can also include first and second pinch rollers spaced from both of the document-retaining spool and the web-supply spool. The web can pass between the first and second pinch rollers. The ATM can also include a scraper positioned between the first and second pinch rollers and the document-retaining spool. The scraper can include a tip resting on a portion of the web wound around the document-retaining spool.

BRIEF DESCRIPTION OF THE DRAWINGS

The detailed description set forth below references the following drawings.

DETAILED DESCRIPTION

The present disclosure, as demonstrated by the exemplary embodiment described below, discloses an automated transaction machine that includes a document-collecting apparatus which can store deposited documents on a document-retaining spool within the interior of the automated transaction machine. The document-retaining spool can be rotated by a single motor which, when driven in one direction, can cause documents inserted into the automated transaction machine to be stored on a web wound around the document-retaining spool. When such single motor is driven in an opposite direction, documents can be removed from the document-retaining spool and, ultimately, returned to the user.

The present disclosure, as demonstrated by the exemplary embodiment described below, can include a belt, driven by the single motor, which is coupled to the document-retaining spool shaft and a web-supply spool shaft. When the single motor is driven in one direction (i.e., a direction by which documents will be stored on the web wrapped around the document-retaining spool), the single motor drives only the document-retaining spool shaft and does not drive the web-supply spool shaft. When the single motor is driven in the opposite direction (i.e., a direction by which documents will be removed from the document-retaining spool and the web wrapped around the web-supply spool), the single motor drives both the document-retaining spool shaft and the web-supply spool shaft. Including only one motor enhances efficiency, reduces energy consumption, and reduces maintenance issues.

A further benefit of the exemplary embodiment is that when documents are stored on the document-retaining spool only the document-retaining spool shaft (and thus the document-retaining spool) is driven. The web-supply spool shaft and the web-supply spool are not driven by the motor when documents are being stored on the document-retaining spool. This can reduce slack on the web on which documents are transported. This increases the efficiency of transporting documents and reduces instances where documents are not properly transported due to, for example, slack in the web or failure of a document to adequately adhere to the web during transport.

Figure 1:
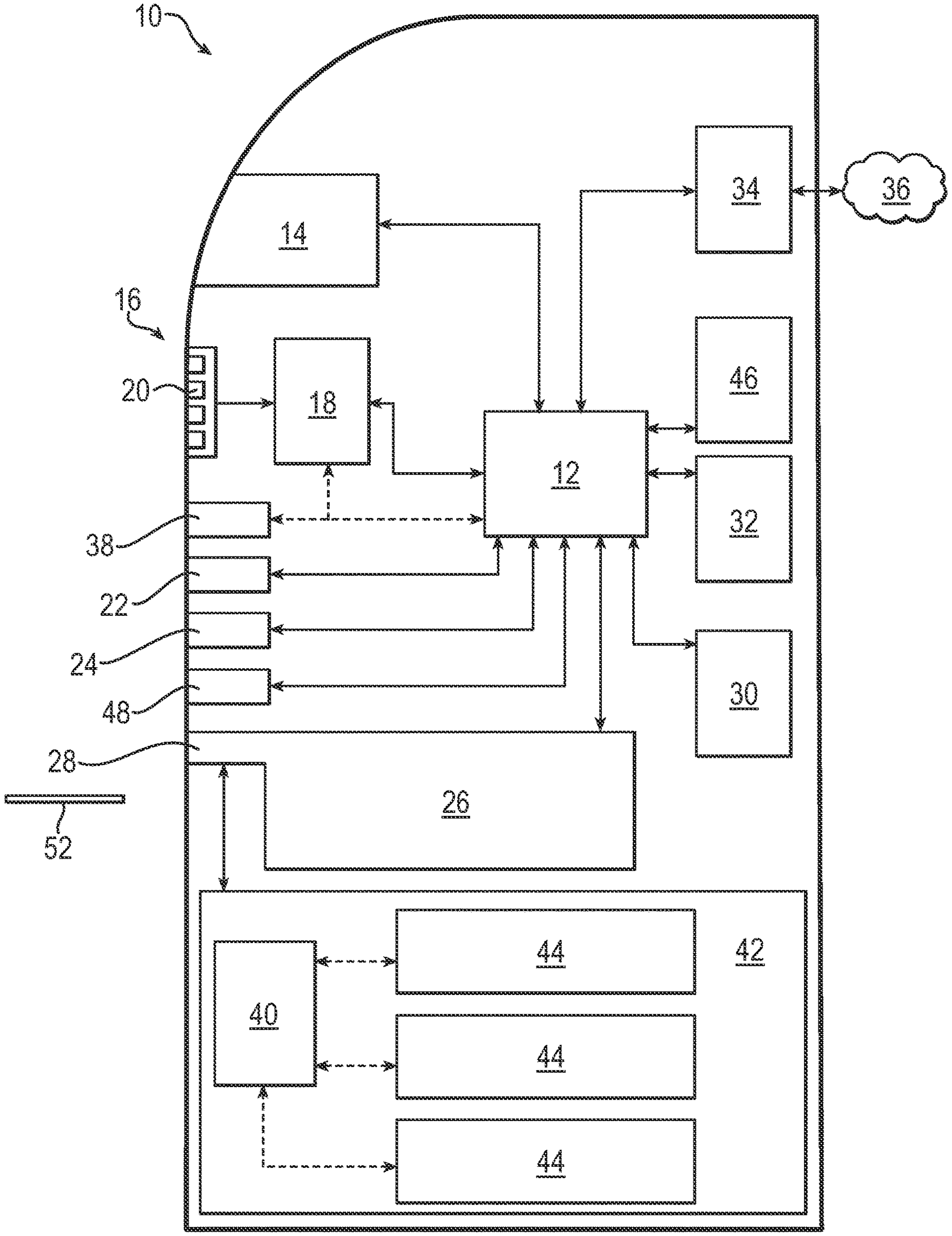
FIG. 1 is a functional block diagram of an exemplary automated transaction machine.

Referring now to the drawings, FIG. 1 discloses a functional block diagram of an exemplary automated transaction machine or ATM 10 according to one or more implementations of the present disclosure. The ATM 10 includes different structures and subsystems for receiving input from a user and executing transactions. The ATM 10 includes a computing device 12. The exemplary computing device 12 has one or more processors and a non-transitory, computer readable medium. The computing device 12 operates under the control of an operating system, kernel, and/or firmware and executes or otherwise relies upon various computer software applications, components, programs, objects, modules, data structures, etc. The exemplary computing device 12 can operate under the control of the Windows® operating system. The computer readable medium (memory) of the computing device 12 can include random access memory (RAM) devices comprising the main storage of computing device 12, as well as any supplemental levels of memory, e.g., cache memories, non-volatile or backup memories (e.g., programmable or flash memories), read-only memories, etc. In addition, the memory may be considered to include memory storage physically located elsewhere from RAM in the computing device 12, such as any cache memory in a processor, as well as any storage capacity used as a virtual memory. The computing device 12 can also include one or more mass storage devices such as, for example, a floppy or other removable disk drive, a hard disk drive, a direct access storage device (DASD), an optical drive (e.g., a CD drive, a DVD drive, etc.), and/or a tape drive, among others, represented by memory 46.

The exemplary ATM 10 also includes a display 14. The computing device 12 can control the display 14 to present information to the user for furthering completion of the transaction. The display 14 can be a touch screen that allows the user to enter information through the display 14. The exemplary display 14 is configured to transmit any user-entered information to the computing device 12.

The exemplary ATM 10 also includes a key pad 16 and an encryption module 18. Generally, the combination of a key pad and an encryption module are referred to in the art as an encrypted pin pad (EPP). The exemplary key pad 16 includes a plurality of keys, such as key 20. The exemplary encryption module 18 has one or more processors and a non-transitory, computer readable medium. The user can press the keys of the key pad 16 to enter a Personal Identification Number (PIN). The key pad 16 is placed in communication with the encryption module 18 and therefore the numbers of the PIN are received by the encryption module 18. It is noted that the communication of the PIN is direct and secure; the PIN cannot be intercepted between the key pad 16 and the encryption module 18. The PIN is then encrypted by the encryption module 18 to define a PIN block. The encryption module 18 includes a network encryption key and applies the network encryption key to encrypt the PIN to the PIN block. The exemplary encryption module 18 is configured to transmit the PIN block to the computing device 12, which can direct the PIN block away from the ATM 10 during the completion of a financial transaction.

The exemplary ATM 10 also includes a card reader 22. The card reader 22 can receive a token from the user, such as a card. The card reader 22 can be configured to execute read and write operations with respect to any storage medium fixed to the user's card. The exemplary card reader 22 can be configured to read data from a magnetic strip on the back of a card or a chip embedded in the card. The exemplary card reader 22 can be configured to transmit any data read from the user's card to the computing device 12, which can direct the data read from the card away from the ATM 10 during completion of a financial transaction. The exemplary card reader 22 can also be configured to receive commands and data from the computing device 12 and change data stored on the user's card.

The exemplary ATM 10 also includes a printer module 24. The computing device 12 can control the printer module 24 to print a receipt when a transaction has been completed. The printer module 24 can communicate one or more messages to the computing device 12, such as a maintenance message regarding the need to refill printer paper.

Figure 5:
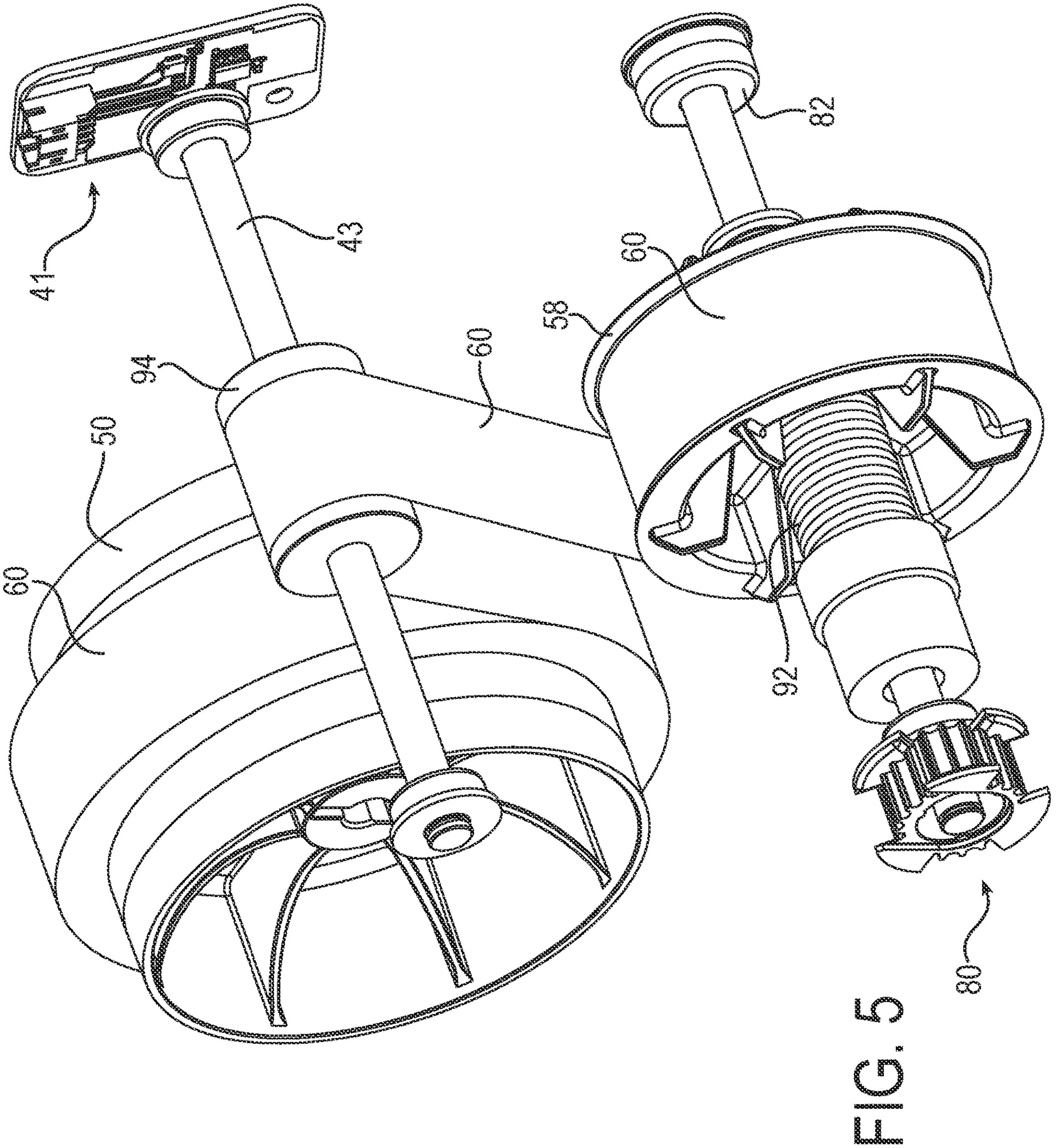
FIG. 5 is a perspective view of a portion of the exemplary document-collecting apparatus shown in the preceding Figures.

The exemplary ATM 10 also includes an article exchange unit or document-collecting apparatus 26. In the exemplary embodiment, document-collecting apparatus 26 is configured to receive items such as checks or paper currency. An exemplary document-collecting apparatus 26 can include a drum or document-retaining spool 50 on which received items are stored. The exemplary document-collecting apparatus 26 includes a fascia 29 including a slot 28 open to an exterior of the ATM 10 for the receipt of such items. In other embodiments of the present disclosure, a document-collecting apparatus can be configured to facilitate the receipt of other items, different than paper. The document-collecting apparatus 26 can include one or more sensors and transmit signals from any such sensors to the computing device 12 to execute an exchange. FIG. 5 shows an exemplary sensor assembly 41 arranged to detect rotation of a shaft 43 (the purpose of the shaft 43 is detailed below). The computing device 12 can control the document-collecting apparatus 26 in response to such signals. For example, the document-collecting apparatus 26 can include a sensor that detects receipt of an item such as a check. The document-collecting apparatus 26 can include a further sensor in the form of a scanner that generates an image of the received item and transmits the image to the computing device 12. When an exchange involves the dispensation of an article to the user, the computing device 12 can control the document-collecting apparatus 26 to dispense the item(s) requested by the user.

The exemplary ATM 10 also includes a printer module 30. The printer module 30 can generate a continuous record of all transactions executed by the ATM 10. The computing device 12 can control the printer module 30 to supplement the record after each transaction has been completed. The printer module 30 can communicate one or more messages to the computing device 12, such as a maintenance message regarding the need to refill printer paper.

The exemplary ATM 10 also includes an access module 32. The access module 32 can be positioned proximate to a rear side of the ATM 10. The access module 32 can be utilized by service and support technicians. For example, the access module 32 can be utilized by a field engineer to complete software updates to the computing device 12. The access module 32 can also be utilized when non-software updates and maintenance is performed, such as the refilling of printer paper or currency.

The exemplary ATM 10 also includes a transceiver 34. The exemplary transceiver 34 is configured to facilitate communication between the computing device 12 and other computing devices that are distinct from and physically remote from the computing device 12. An example of such a remote computing device is a server computing device, such as a banking or financial institution server communicating with a plurality of ATMs. The exemplary transceiver 34 places the computing device 12 in communication with one or more networks, such as network 36. The network 36 can be a local area network (LAN), a wide area network (WAN) such as the Internet, a Multi-protocol label switching (MPLS) network, a cellular network such as operated by cellular phone companies, or any combination thereof. The network 36 can be a financial/bank network such as NYCE, PULSE, PLUS, Cirrus, AFFN, Interac, Interswitch, STAR, LINK, MegaLink, or BancNet. The transceiver 34 can transmit data and requests for input generated by the computing device 12 and receive responses to these requests, directing these responses to the computing device 12.

The exemplary ATM 10 also includes a transceiver 38. The exemplary transceiver 38 is configured to facilitate communication between at least one of the encryption module 18 and the computing device 12 and other computing devices that are distinct from and physically proximate to the ATM 10. An example of such a proximate computing device is a smartphone possessed by the user. The dashed connection lines in FIG. 1 represent optional interconnections. The exemplary transceiver 38 can place the user's smartphone in communication with the encryption module 18, the computing device 12, or both. The exemplary transceiver 38 can implement various communication protocols. For example, the transceiver 38 can be a Near Field Communication (NFC) device. Alternatively, the transceiver 38 can be a Bluetooth beacon. The transceiver 38 can transmit and receive data and requests for input generated by the encryption module 18 and/or the computing device 12, such transmissions occurring with the user's smart phone for example.

The exemplary ATM 10 also includes an advanced function dispenser (AFD) 40. The AFD 40 can dispense banknotes, such as currency. The exemplary AFD 40 is positioned in a safe 42. One or more cassettes or cash boxes 44 are also positioned and protected in the safe 42. Banknotes are stored in the cassettes 44 for disbursement to a user of the ATM 10. The exemplary AFD 40 can extract the banknotes from one or more of the cassettes 44 and direct them out of the ATM 10 through the slot 28. The AFD 40 thus communicates with the slot 28 in parallel with the document-collecting apparatus 26. The exemplary AFD 40 can communicate with and be controlled by the computing device 12 for at least some operations. Each of the cassettes 44 can engage the AFD 40 through a rack whereby the positioning of the cassettes is controlled. Further, the each of the cassettes 44 and the AFD 40 can include mating connectors of any form, whereby a positive interconnection is confirmed electronically. When one or more of the cassettes 44 and the AFD 40 are not properly interconnected, a signal or lack thereof can be communicated to the computing device 12 whereby an error message is generated or the ATM 10 can be disabled.

The exemplary ATM 10 also includes a scanner 48. The scanner 48 can scan, for example, at least a portion of a display of a smart phone and communicate the scanned display to the computing device 12. A token can be displayed on the display of the smart phone and thus scanned by the scanner 48. The token can be a bar code, a quick response (QR) code, a number, a string of alphanumeric characters, a weblink, or some other symbolic indicia. The exemplary scanner 48 is configured to transmit any scanned data to the computing device 12, which can direct the scanned away from the ATM 10 during completion of a financial transaction.

Figure 2:
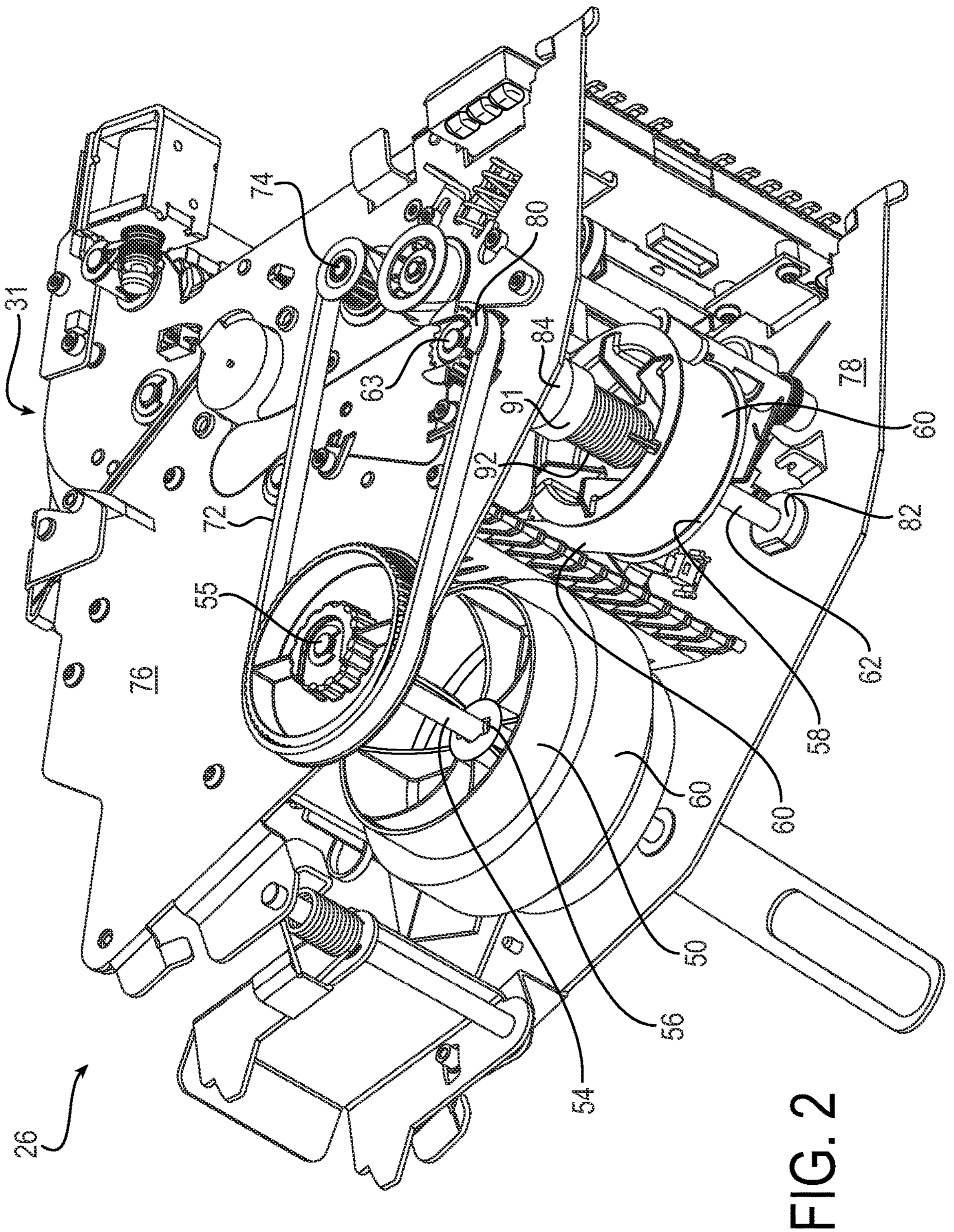
FIG. 2 is a perspective view of an exemplary document-collecting apparatus of the exemplary automated transaction machine.

FIG. 2 is a perspective view of at least a portion of the exemplary document-collecting apparatus 26 of the exemplary ATM 10. The document collecting-apparatus 26 can be positioned within the ATM 10 to receive documents 52 inserted through the slot 28 in the fascia 29 of the ATM 10. The document-collecting apparatus 26 can include a document-retaining spool 50 on which documents 52 can be retained or disbursed in conjunction with the rotation of the document-retaining spool 50. The document-retaining spool 50 can be shaped as a hollow cylinder with an orifice 56 through its center. The orifice 56 can be circular or non-circular (keyed). The document-retaining spool 50 can be constructed out of, for example, stainless steel, plastic (including pvc), ceramics, or other suitable materials. Documents 52 can include checks and paper money.

The exemplary document-collecting apparatus 26 can include a document-retaining-spool shaft 54 extending through the orifice 56 in the center of the document-retaining spool 50. The document-retaining-spool shaft 54 can be constructed out of, for example, stainless steel, plastic (including pvc), ceramics, or other suitable materials. The document-retaining-spool shaft 54 can be coupled to a sensor or an encoder which can provide data as to linear web speed and/or rotation speed. The document-retaining spool 50 can be coupled to the document-retaining-spool shaft 54 such that their rotations are coupled to one another and the document-retaining-spool shaft 54 rotates with the rotation of the document-retaining spool 50.

The exemplary document-collecting apparatus 26 can include a web-supply spool 58 on which the web 60 can be retained or disbursed in conjunction with the rotation of the web-supply spool 58. The web-supply spool 58 can be shaped as a hollow cylinder with an orifice 64 in its center, and a web-supply-spool shaft 62 can extend through the orifice 64. The web-supply spool 58 can be constructed out of, for example, stainless steel, plastic (including pvc), ceramics, or other suitable materials. The web 60 has a first end 66 wound around the document-retaining spool 50 and a second end 68 opposite to the first end 66 and wound around the web-supply spool 58. The web 60 can include printed bars located at each end of the web 60 which can be read by sensors to indicate the beginning and end of the web 60.

The document-collecting apparatus 26 can include a single motor 70 operatively connected to the document-retaining-spool shaft 54 and the web-supply-spool shaft 62. The single motor 70 selectively drives the document-retaining-spool shaft 54 and the web-supply-spool shaft 62. The web-supply-spool shaft 62 can be coupled to a sensor or an encoder capable of providing data regarding linear web speed and/or rotation speed.

As shown in FIG. 2, the exemplary document-collecting apparatus 26 can include a single belt 72 interconnecting a drive shaft 74 of said single motor 70 with both of the document-retaining-spool shaft 54 and the web-supply spool shaft 62. The belt 72 can interconnect the drive shaft 74 with a first end 55 of document-retaining-spool shaft 54 and a first end 63 of web-supply-spool shaft 62. The document-retaining-spool shaft 54 and the web-supply-spool shaft 62 respectively extend through respective orifices in a first mounting plate 76 and a second mounting plate 78. The first mounting plate 76 supports the first end 63 of the web-supply-spool shaft 62 and the second mounting plate 78 supports a second end 65 of the web-supply-spool shaft 62. In addition, the first mounting plate 76 supports the first end 55 of document-retaining-spool shaft 54 and the second mounting plate 78 supports a second end (not visible in the Figures) of the document-retaining-spool shaft 54.

In the exemplary embodiment, the document-retaining spool 50 and the document-retaining-spool shaft 54 are fixed together for concurrent rotation and the web-supply spool 58 and the web-supply-spool shaft 62 are rotatable with respect to one another.

Figure 4:
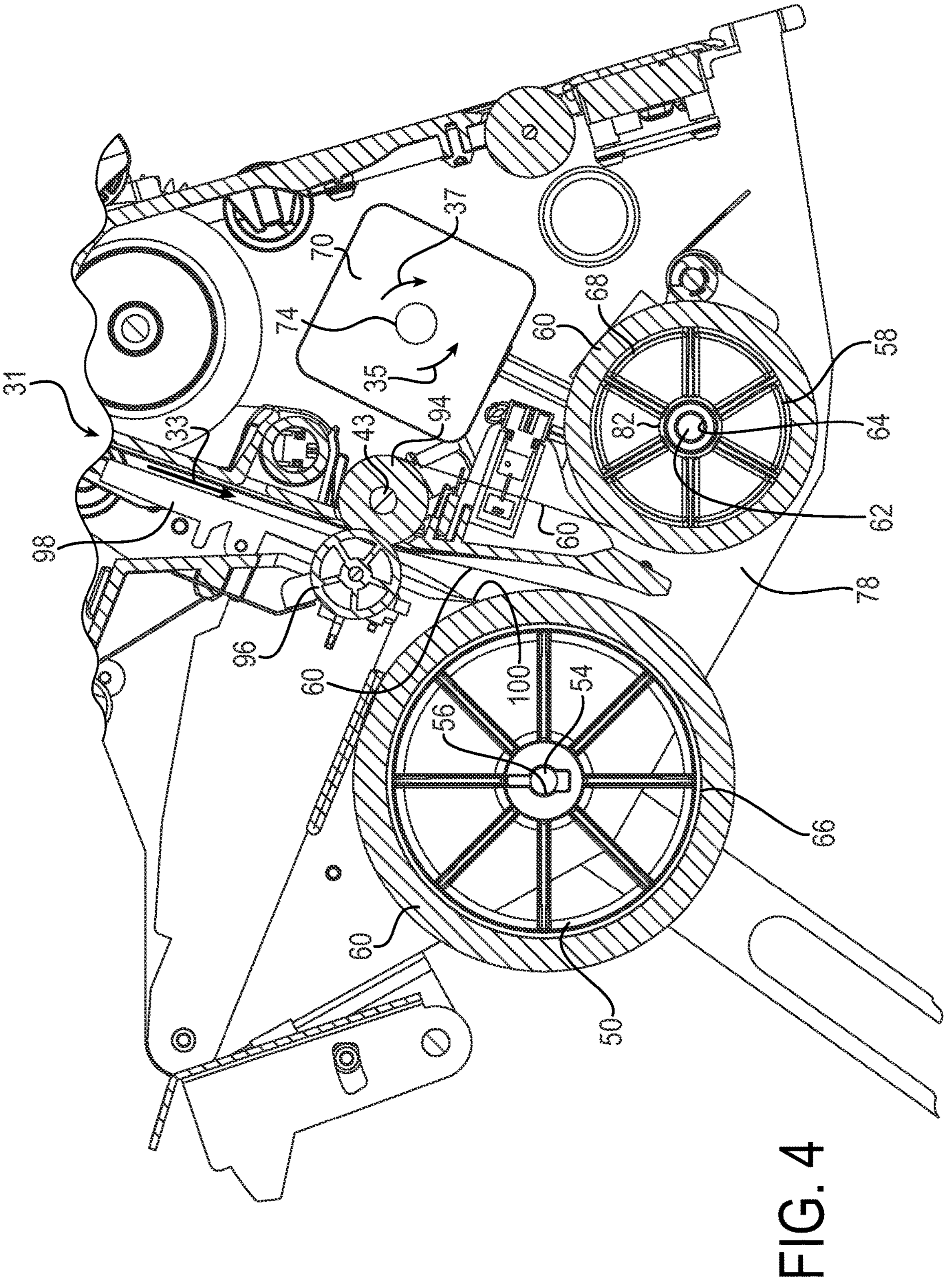
FIG. 4 is a cross-sectional side view of the exemplary document-collecting apparatus shown in FIG. 2.

In the exemplary embodiment, a first clutch 80 can be operably disposed between the belt 72 and the web-supply-spool shaft 62. The single motor 70 is configured to rotate the drive shaft 74 in first and second, opposite directions. In FIG. 4, the first direction is referenced at 35 and the second direction is referenced at 37. The first clutch 80 is configured to transmit movement of the belt 72 to rotation of the web-supply-spool shaft 62 only when drive shaft 74 is rotating in the first direction 35. The first direction 35 corresponds to the web 60 being drawn onto the web-supply spool 58, the web 60 being drawn off of the document-retaining spool 50, and the document 52 being taken off of the document-retaining spool 50. The first clutch 80 can be mounted in and supported by the first mounting plate 76. A second clutch 82 can be operably disposed between the second mounting plate 78 and the web-supply-spool shaft 62. The exemplary second clutch 82 is configured to prevent movement of the web-supply-spool shaft 62 only when the drive shaft 74 is rotating in the second direction 37. The second direction 37 corresponds to the web 60 being drawn off of the web-supply spool 58, the web 60 be drawn onto the document-retaining spool 50, and the document 52 being taken onto the document-retaining spool 50. As set forth above, the exemplary web-supply spool 58 is rotatably mounted on the web-supply-spool shaft 62.

Figure 3:
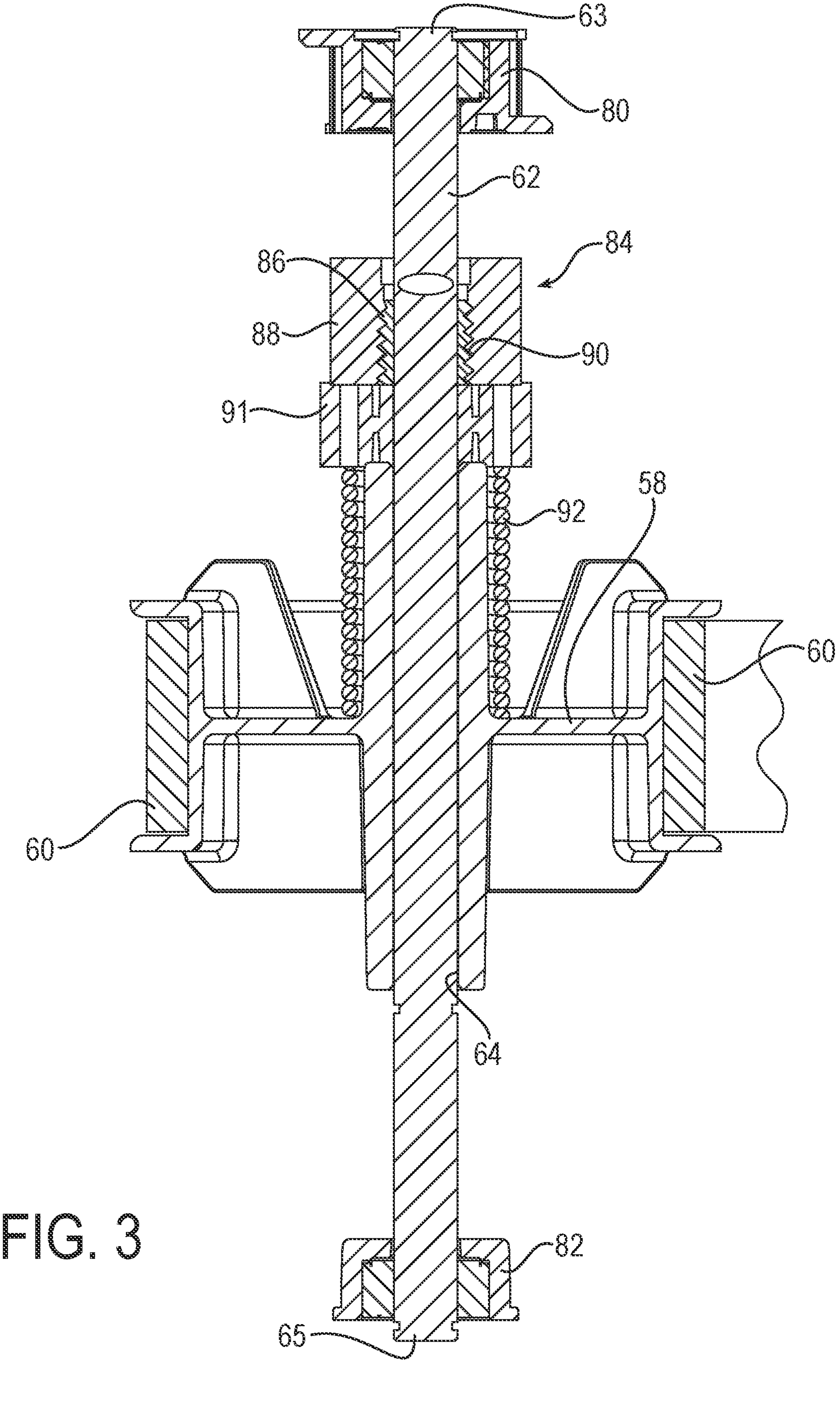
FIG. 3 is a cross-sectional view of the exemplary embodiment of a web-supply spool and web-supply-spool shaft associated with the document-collecting apparatus shown in FIG. 2.

FIG. 3 is a cross-sectional view of an exemplary embodiment of the web-supply spool 58 and the web-supply-spool shaft 62. The exemplary document-collecting apparatus 26 also includes a third clutch 84 operably disposed between the web-supply-spool shaft 62 and the web-supply spool 58. The third clutch 84 can be configured to dampen relative movement between the web-supply-spool shaft 62 and the web-supply spool 58 when the drive shaft 74 is rotating in either of the first direction 35 or the second direction 37. It is noted that in FIGS. 3 and 4, portions of the web 60 are shown as a unitary blocks, based on how the cross-hatching is applied rather than numerous layers. However, it is noted that this approach to showing the web 60 has been done to simplify the display of the web 60; these portions of the web 60 that are shown in cross-section are defined by a plurality of thin layers of material.

With particular reference to FIG. 3, the exemplary third clutch 84, which can be a friction clutch, includes a first portion 86 fixed on the web-supply-spool shaft 62. The exemplary third clutch 84 also includes a second portion 88 engaged with the web-supply spool 58. A friction surface 90 can be positioned between the first portion 86 and the second portion 88. The friction surface can be defined by or adhered to either the first portion 86 or the second portion 88, or both. The exemplary second portion 88 is freely rotatable relative to the web-supply-spool shaft 62. The first portion 86 and the second portion 88 can be configured to slide across one another along the friction surface 90 during movement relative to one another. The exemplary friction surface 90 inhibits but does not preclude relative movement between the portions 86, 88. A friction clutch having part number OTLV6-1000B (from Origin Brand), with a 1000 gram force*cm torque limit, can be utilized in one or more embodiments of the present disclosure.

The exemplary document-collecting apparatus 26 also includes a spacer 91 and a torsion spring 92 operably disposed between the second portion 88 of the third clutch 84 and the web-supply spool 58. The spacer 91 can interconnect the second portion 88 and the spring 92. The spacer 91 and the second portion 88 can be fixed for concurrent rotation, but could be axially moveable relative to one another. For example, the spacer 91 and the second portion 88 could be interconnected with splines. The spacer 91 can be a desirable inclusion in one or more embodiments of the present disclosure to accommodate different size springs and spools. The exemplary spring 92 is a helical torsion spring.

In an exemplary embodiment, as shown in FIG. 2, the first clutch 80 can be operably positioned between the first end 63 of the web-supply-spool shaft 62 and the belt 72. The first clutch 80 can be configured to transmit only one direction of movement of the belt 72 into rotation of the web-supply-spool shaft 62. In addition, the second clutch 82 can be operably positioned between the second end 65 of the web-supply-spool shaft 62 and the second mounting plate 78. The second clutch 82 can be configured to permit rotation of the web-supply-spool shaft 62 in only one direction. In an exemplary embodiment, the third clutch 84 can be a friction clutch operably positioned between the web-supply spool 58 and the web-supply-spool shaft 62, with the third clutch 84 permitting and dampening relative movement between the web-supply spool 58 and the web-supply-spool shaft 62.

In an exemplary embodiment, the torsion spring 92 can be operably positioned between the web-supply spool 58 and the third clutch 84. The exemplary torsion spring 92 permits relative movement between the web-supply spool 58 and the spacer 91/second portion 88. The exemplary spring 92 stores energy arising during relative movement between the web-supply spool 58 and the spacer 91/second portion 88 through elastic deformation. The energy can then be released by inducing relative movement through elastic recovery. For example, when shaft 62 has ceased moving, the web-supply spool 58 can be lagging or be "behind" the shaft 62 relative to rotation and the spring 92 can elastically recover and induce at least partial or full "catch-up" rotation of the web-supply spool 58.

FIG. 4 is a cross-sectional side view of the exemplary document-collecting apparatus 26 of an exemplary ATM 10. As shown in FIG. 4, an exemplary embodiment can include a first pinch roller 94 and a second pinch roller 96 spaced from both of the document-retaining spool 50 and the web-supply spool 58. The roller 94 is supported on the shaft 43. FIG. 5 shows that the path of the exemplary web 60 extends from the spool 58, between the first pinch roller 94 and the second pinch roller 96, and to the spool 50. The exemplary embodiment also includes a scraper 98 having a tip 100 that rests on a portion of the web 60 that is wound around the document-retaining spool 50. The tip 100 is positioned along a path of the web 60 that is between the first and second pinch rollers 94, 96 and the document-retaining spool 50.

In an exemplary method of collecting a document in the automated transaction machine 10, the document 52 can be inserted in the slot 28. The position of the slot 28 relative to other components is referenced generally at 31 in FIGS. 2 and 4. The document 52 moves through the ATM 10, toward the pinch rollers 94, 96 in a direction referenced at 33 in FIG. 4. The document 52 and web 60 are pressed together between the pinch rollers 94, 96. The document 52 is then adhered to the web and drawn onto the document-retaining spool 50, between radially-adjacent layers of the web 60. With reference to the perspective of FIG. 4, the spools 50, 58 are being rotated clockwise. Also, during these events, the drive shaft 74 is rotating in the second direction 37, the first clutch 80 is not transmitting rotation to the shaft 62, and the second clutch 82 is preventing rotation of the shaft 62. Thus, the spool 58 is being "pulled" by the web 60 to rotate relative to the shaft 62 and against the dampening effect of the third clutch 84 that is produced by the spring 92 and the friction surface 90. After the document 52 has been received on the spool 50 and rotation of the drive shaft 74 stops, the energy stored in the spring 92 can slowly dissipate as the spring 92 urges the second portion 88 to rotate relative to the first portion 86, with the friction surface 90 resisting and dampening such rotation. The exemplary first portion 86 is fixed to the shaft 62, which is prevented from rotating in that direction by the second clutch 82.

In an exemplary method of releasing a document from the automated transaction machine 10, the drive shaft 74 can be rotated by the motor 70 in the first direction 35 and thereby rotate the shafts 54 and 62, and thus the spools 50 and 58, counter-clockwise (based on the perspective of FIG. 4). The tip 100 of the scraper 98, resting on the web 60, can separate the document 52 from a radially-inner layer of the web 60. The document 52 can maintain adherence to a radially-outer layer of the web 60 and thereby be carried to the pinch rollers 94, 96. The pinch rollers 94, 96 cooperate to separate the document 52 from the web 60. The document 52 then moves within the ATM 10 in a direction opposite to the direction 33 and passes out of the slot 28. As set forth above, with reference to the perspective of FIG. 4, both of the spools 50, 58 are being rotated counter-clockwise during the release of a document. Also, during the document release process, the first clutch 80 is transmitting rotation to the shaft 62 and the second clutch 82 is ratcheting or experiencing lost motion because the shaft 62 is rotating relative to the second clutch 82. The third clutch 84 is forcing the spool 58 to rotate and pull the web 60 onto itself. However, the third clutch 84 and the spring 92 permit the spool 58 to lag in rotation, somewhat, relative to the shaft 62. After the document 52 has been released and rotation of the drive shaft 74 stops, the energy stored in the spring 92 can slowly dissipate as the spring 92 urges the second portion 88 to rotate relative to the first portion 86, with the friction surface 90 resisting and dampening such rotation. This motion can ensure the web 60 is taut, but not over-stretched.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or sub-combinations that are disclosed herein is hereby unconditionally reserved. The use of the words "can" and "may" in this document is not an assertion that the subject preceding the word is unimportant or unnecessary or "not critical" relative to anything else in this document. The words "can" and "may" are used herein in a positive and affirming sense and no other motive should be presumed. More than one "invention" may be disclosed in the present disclosure; an "invention" is defined by the content of a patent claim and not by the content of a detailed description of an embodiment of an invention.

What is claimed is:

1. A document-collecting apparatus of an automated transaction machine comprising:

a document-retaining spool;

a document-retaining-spool shaft extending through an orifice in a center of said document-retaining spool, said document-retaining spool and said document-retaining-spool shaft fixed together for concurrent rotation;

a web-supply spool;

a web-supply-spool shaft extending through an orifice in a center of said web-supply spool, said web-supply spool and said web-supply-spool shaft are rotatable with respect to one another;

a web having a first end wound around said document-retaining spool and a second end opposite to said first end and wound around said web-supply spool;

a single motor having a drive shaft operatively connected to and configured to selectively drive said document-retaining-spool shaft and said web-supply-spool shaft, said single motor configured to rotate said drive shaft in first and second, opposite directions;

a first clutch disposed on said web-supply-spool shaft and between said single motor and said web-supply-spool shaft, said first clutch configured to transmit movement of said drive shaft to rotation of said web-supply-spool shaft only when said drive shaft is rotating in said first direction;

a second clutch disposed on said web-supply-spool shaft, said second clutch configured to prevent movement of said web-supply-spool shaft only when said drive shaft is rotating in said second direction; and a third clutch disposed between said web-supply-spool shaft and said web-supply spool, said third clutch configured to dampen relative movement between said web-supply-spool shaft relative to said web-supply spool when said drive shaft is rotating in said first direction;

wherein during document collection a document is adhered to the web and drawn onto the document-retaining spool between radially-adjacent layers of the web with the drive shaft rotating in the second direction where the first clutch is not transmitting rotation to the document-retaining spool shaft, and the second clutch prevents rotation of the document-retaining spool shaft, and the spool is pulled by the web to rotate relative to the shaft and against a dampening effect of the third clutch; and wherein during document release with the drive shaft rotating in the first direction the first clutch is transmitting rotation to the document-retaining spool shaft and the second clutch is ratcheting or experiencing lost motion as the document-retaining spool shaft rotates relative to the second clutch, and the third clutch permits the document-retaining spool to lag in rotation relative to the document-retaining spool shaft.

2. The document-collecting apparatus of claim 1 further comprising:

a single belt interconnecting the drive shaft of said single motor with both of said document-retaining-spool shaft and said web-supply spool shaft.

3. The document-collecting apparatus of claim 2:

wherein the first clutch is disposed between said belt and said web-supply-spool shaft.

4. The document-collecting apparatus of claim 3 further comprising:

a mounting plate supporting a second end of said web-supply-spool shaft; and the second clutch is disposed between said mounting plate and said web-supply-spool shaft.

5. The document-collecting apparatus of claim 4 wherein said third clutch further comprises a first portion fixed on said web-supply-spool shaft and a second portion engaged with said web-supply spool and a friction surface positioned between said first portion and said second portion, said second portion freely rotatable relative to said web-supply-spool shaft, said first portion and said second portion configured to slide across one another along said friction surface during movement relative to one another.

6. The document-collecting apparatus of claim 5 further comprising:

a torsion spring operably disposed between said second portion of said third clutch and said web-supply spool.

7. A method of collecting documents in an automated transaction machine comprising:

providing a document collecting apparatus including:

a document-retaining-spool shaft through an orifice in a center of a document-retaining spool;

a web-supply-spool shaft through an orifice in a center of a web-supply spool;

a web with a first end of the web wound around the document-retaining spool and a second end of the web opposite to the first end wound around the web-supply spool;

a first clutch disposed on said web-supply-spool shaft and between said single motor and said web-supply-spool shaft, said first clutch configured to transmit movement of said drive shaft to rotation of said web-supply-spool shaft only when said drive shaft is rotating in said first direction;

a second clutch disposed on said web-supply-spool shaft, said second clutch configured to prevent movement of said web-supply-spool shaft only when said drive shaft is rotating in said second direction; and a third clutch disposed between said web-supply-spool shaft and said web-supply spool, said third clutch configured to dampen relative movement between said web-supply-spool shaft relative to said web-supply spool when said drive shaft is rotating in said first direction selectively driving both of the document-retaining-spool shaft and the web-supply-spool shaft with a single motor having a drive shaft, said single motor configured to rotate said drive shaft in first and second, opposite directions;

wherein during document collection a document is adhered to the web and drawn onto the document-retaining spool between radially-adjacent layers of the web with the drive shaft rotating in the second direction where the first clutch is not transmitting rotation to the document-retaining spool shaft, and the second clutch prevents rotation of the document-retaining spool shaft, and the spool is pulled by the web to rotate relative to the shaft and against a dampening effect of the third clutch; and wherein during document release with the drive shaft rotating in the first direction the first clutch is transmitting rotation to the document-retaining spool shaft and the second clutch is ratcheting or experiencing lost motion as the document-retaining spool shaft rotates relative to the second clutch, and the third clutch permits the document-retaining spool to lag in rotation relative to the document-retaining spool shaft.

8. The method of claim 7 wherein the drive shaft of the single motor to the document-retaining-spool shaft and also to the web-supply-spool shaft with a single belt.

9. The method of claim 8 further comprising:

passing the web around a first pinch roller positioned between the document-retaining spool and the web-supply spool;

receiving a document through a slot defined in a fascia of the automated transaction machine;

rotating the drive shaft of the single motor in the first rotational direction of the drive shaft and thereby drawing the web onto the document-retaining spool and also thereby passing the web around the first pinch roller in a first rotational direction of the first pinch roller;

directing the document between the first pinch roller and a second pinch roller after said receiving whereby the web and the document are pressed together between the first and second pinch rollers during said rotating; and drawing, during said rotating, the document in between first and second portions of the web wound about the document-retaining-spool with both of the first and second portions of the web in contact with the document.

10. The method of claim 9 further comprising:

rotating the drive shaft of the single motor in the second rotational direction of the drive shaft opposite of the first rotational direction of the drive shaft, thereby drawing the web onto the web-supply spool and also passing the web around the first pinch roller in a second rotational direction of the first pinch roller opposite of the first rotational direction of the first pinch roller; and separating the document from the first portion of the web with a scraper during said rotating.

11. The method of claim 10 further comprising:

directing the document from a tip of the scraper to pass between the first pinch roller and the second pinch roller during said rotating the drive shaft of the single motor in the second rotational direction of the drive shaft.

12. The method of claim 10 further comprising:

directing the document between the first pinch roller and the second pinch roller after said separating whereby the web and a first side of the document are separated from one another while a second side of the document is maintained in contact with the web.

13. An automated transaction machine (ATM) comprising:

a fascia including a slot; and a document-collecting apparatus positioned within said ATM and configured to receive documents inserted through said slot and including:

a document-retaining spool;

a document-retaining-spool shaft extending through an orifice in a center of said document-retaining spool, said document-retaining spool and said document-retaining-spool shaft fixed together for concurrent rotation;

a web-supply spool;

a web-supply-spool shaft extending through an orifice in a center of said web-supply spool, said web-supply spool and said web-supply-spool shaft are rotatable with respect to one another;

a web having a first end wound around said document-retaining spool and a second end opposite to said first end and wound around said web-supply spool; and a single motor having a drive shaft operatively connected to and configured to selectively drive said document-retaining-spool shaft and said web-supply-spool shaft, said single motor configured to rotate said drive shaft in first and second, opposite directions;

a first clutch disposed on said web-supply-spool shaft and between said single motor and said web-supply-spool shaft, said first clutch configured to transmit movement of said drive shaft to rotation of said web-supply-spool shaft only when said drive shaft is rotating in said first direction;

a second clutch disposed on said web-supply-spool shaft, said second clutch configured to prevent movement of said web-supply-spool shaft only when said drive shaft is rotating in said second direction; and a third clutch disposed between said web-supply-spool shaft and said web-supply spool, said third clutch configured to dampen relative movement between said web-supply-spool shaft relative to said web-supply spool when said drive shaft is rotating in said first direction;

wherein during document collection a document is adhered to the web and drawn onto the document-retaining spool between radially-adjacent layers of the web with the drive shaft rotating in the second direction where the first clutch is not transmitting rotation to the document-retaining spool shaft, and the second clutch prevents rotation of the document-retaining spool shaft, and the spool is pulled by the web to rotate relative to the shaft and against a dampening effect of the third clutch; and wherein during document release with the drive shaft rotating in the first direction the first clutch is transmitting rotation to the document-retaining spool shaft and the second clutch is ratcheting or experiencing lost motion as the document-retaining spool shaft rotates relative to the second clutch, and the third clutch permits the document-retaining spool to lag in rotation relative to the document-retaining spool shaft.

14. The ATM of claim 13 further comprising:

a belt interconnecting a drive shaft of said motor with both of a first end of said document-retaining-spool shaft and a first end of said web-supply-spool shaft by extending around all of said drive shaft and said first end of said document-retaining-spool shaft and said first end of said web-supply-spool shaft; and a mounting plate supporting both of a second end of said document-retaining-spool shaft and a second end of said web-supply-spool shaft.

15. The ATM of claim 14 further comprising:

said first clutch positioned on said first end of said web-supply-spool shaft and between said first end of said web-supply-spool shaft and said belt, said first clutch configured to transmit only one direction of movement of said belt into rotation of said web-supply-spool shaft; and said second clutch positioned on one of said second end of said web-supply-spool shaft and said mounting plate and between said second end of said web-supply-spool shaft and said mounting plate, said second clutch configured to permit rotation of said web-supply-spool shaft in only one direction.

16. The ATM of claim 15 wherein said orifice of said web-supply spool is further defined as circular and said orifice of said web-supply spool shaft is circular, whereby said web-supply spool is not driven in rotation directly by said web-supply spool shaft.

17. The ATM of claim 16 where the third clutch comprises:

a friction clutch operably positioned between said web-supply spool and said web-supply-spool shaft; and a torsion spring operably positioned between said friction clutch one of said web-supply spool and said web-supply spool shaft, said torsion spring permitting relative movement between said friction clutch and said one of said web-supply spool and said web-supply spool shaft, configured to store energy associated with relative movement between said friction clutch and said one of said web-supply spool and said web-supply spool shaft through elastic deformation, and also configured to induce relative movement between said friction clutch and said one of said web-supply spool and said web-supply spool shaft through elastic recovery when storing energy.

18. The ATM of claim 17 further comprising:

first and second pinch rollers spaced from both of said document-retaining spool and the web-supply spool, wherein said web passes between said first and second pinch rollers; and a scraper positioned along a path of said web between said first and second pinch rollers and said document-retaining spool, said scraper including a tip resting on a portion of said web that is wound around said document-retaining spool.

* * * * *